UNITED STATES PATENT OFFICE.

ALFRED KERN, OF BASLE, SWITZERLAND, ASSIGNOR TO THE BADISCHE ANILIN AND SODA FABRIK, OF MANNHEIM, GERMANY.

MANUFACTURE OF ETHYL-BLUE COLORING-MATTER.

SPECIFICATION forming part of Letters Patent No. 297,413, dated April 22, 1884.

Application filed January 10, 1884. (No specimens.)

*To all whom it may concern:*

Be it known that I, ALFRED KERN, a citizen of the Swiss Republic, residing at Basle, Switzerland, have invented new and useful Improvements in the Manufacture of a Blue Dye-Stuff or Coloring-Matter, of which the following is a specification.

This invention relates to the production of a blue dye-stuff or coloring-matter produced by the condensation of alpha-phenyl-naphthylamine with tetra-ethyl-diamido-benzophenone.

In carrying out this invention, I take ten parts, by weight, of dry and finely-powdered tetra-ethyl-diamido-benzophenone and mix the same intimately with about nine parts, by weight, of alpha-phenyl-naphthylamine, and I then add about seven parts, by weight, of oxychloride of phosphorus. The mixture thus obtained is kept constantly stirred until the reaction, which quickly sets in, and which manifests itself by a considerable rise of temperature, gradually begins to subside. I then heat the semi-fluid dark-colored product thus obtained up to a temperature of about 110° centigrade, and I maintain the said temperature during about one-quarter of an hour, or until a bronze-colored "melt" is obtained, which solidifies upon cooling. In order to separate my new blue coloring-matter thus produced, the said melt is powdered and then washed with cold water until the washings, which are green at first, begin to assume a bluish coloration. The washed residue is then dissolved in about one thousand parts of boiling water, the froth which rises to the surface is well skimmed off, and the solution thus obtained is allowed to settle, and afterward filtered and precipitated with common salt, after the addition of about one part, by volume, of strong hydrochloric acid of about 1.18 specific gravity. The precipitated coloring-matter may be further purified by redissolving the same in about eight hundred parts of boiling water, filtering and precipitating the clear solution thus obtained in the manner before described, and drying the precipitate at a temperature of about 80° centigrade.

The blue dye-stuff or coloring-matter prepared by the above process, and which I term "Victoria blue B B," presents the general characteristics of "Victoria blue B," its lower homologue, prepared from tetra-methyl diamido-benzophenone and alpha-phenyl-naphthylamine substantially by the same process, and which forms the subject-matter of a separate application for Letters Patent, bearing date the 17th day of December of the year 1883. "Victoria blue B B" principally differs from the said "Victoria blue B" by the more greenish hue of the shades which it is capable of producing in dyeing and printing when employed in the same manner as its said lower or methylated homologue.

What I claim as new, and desire to secure by Letters Patent, is—

The blue coloring-matter produced by the condensation of alpha-phenyl-naphthylamine with tetra-ethyl-diamido-benzophenone, and having the characteristics above described.

In testimony whereof I have hereunto set my hand and seal in the presence of two subscribing witnesses.

ALFRED KERN. [L. S.]

Witnesses:
N. HENZI,
CHS. A. RICHTER.